United States Patent [19]

Bilgin

[11] Patent Number: 4,789,511

[45] Date of Patent: Dec. 6, 1988

[54] MATERIAL PROCESSING

[75] Inventor: Sitki Bilgin, Bradford, United Kingdom

[73] Assignee: University of Manchester Institute of Science and Technology, Manchester, England

[21] Appl. No.: 14,765

[22] PCT Filed: Jun. 4, 1986

[86] PCT No.: PCT/GB86/00314

§ 371 Date: Mar. 30, 1987

§ 102(e) Date: Mar. 30, 1987

[87] PCT Pub. No.: WO86/07285

PCT Pub. Date: Dec. 18, 1986

[30] Foreign Application Priority Data

Jun. 4, 1985 [GB] United Kingdom ............... 8514043

[51] Int. Cl.$^4$ ............................................. B29C 47/12
[52] U.S. Cl. ................................. 264/108; 264/209.8; 264/349; 425/206; 425/207; 425/461; 425/466
[58] Field of Search .................... 264/108, 209.8, 349; 425/205–209, 461, 465–467, 381

[56] References Cited

U.S. PATENT DOCUMENTS

| 1,768,671 | 7/1930 | Devine | 425/467 |
| 3,106,746 | 10/1963 | Sunday | 425/462 |
| 3,234,597 | 2/1966 | Peborgh | 425/380 |
| 3,244,781 | 4/1966 | Covington, Jr. et al. | 264/209.2 |
| 3,382,220 | 5/1968 | Bowman, Jr. | 264/209.7 |
| 3,479,989 | 11/1969 | Hunter et al. | 425/207 |
| 3,488,416 | 1/1970 | Rothschild | 264/349 |
| 3,490,097 | 1/1970 | Gould | 425/381 |
| 3,676,535 | 7/1972 | Juel | 425/380 |
| 4,057,610 | 11/1977 | Goettler et al. | 264/209.8 |

FOREIGN PATENT DOCUMENTS

| 2142818 | 2/1973 | France | 425/466 |
| 52-6761 | 1/1977 | Japan | 264/108 |
| 58-2054 | 1/1983 | Japan | 425/466 |

Primary Examiner—Jeffery Thurlow
Attorney, Agent, or Firm—Spensley Horn Jubas & Lubitz

[57] ABSTRACT

A method of materials processing (e.g. polymer extrusion) in which the material flows along an axially extending passageway. A pressure differential is established across the passageway transverse to the axial flow direction so as to create a flow of material through the die which has a velocity component transverse to the axial flow direction. Preferably the pressure differential transverse to the extrusion direction is continuous thereby establishing a continuous change of velocity component transverse to the axial flow direction. Preferably also there is at least one reversal of transverse pressure differential (and hence transverse velocity component). Apparatus for performing this method comprises for example, successive sections (3-5) of identical trapezoidal cross section with adjacent ones of these sections having their cross-sections displaced through 180° relative to each other.

24 Claims, 2 Drawing Sheets

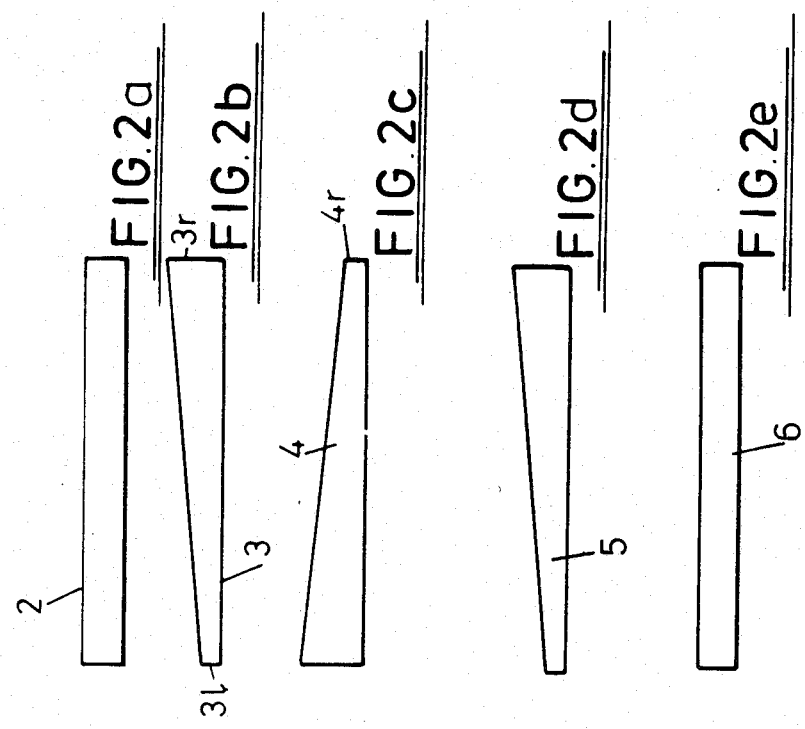
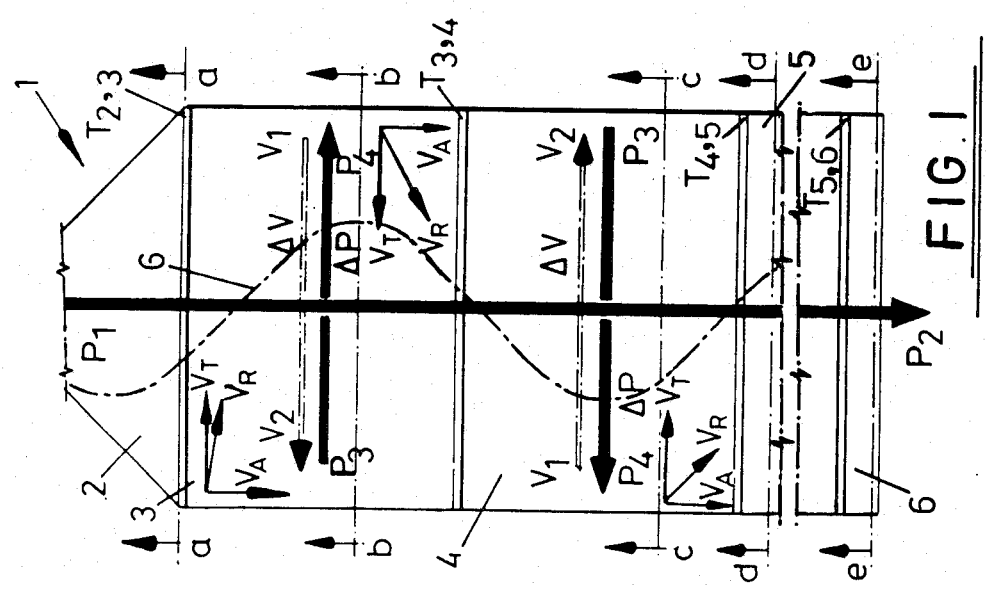

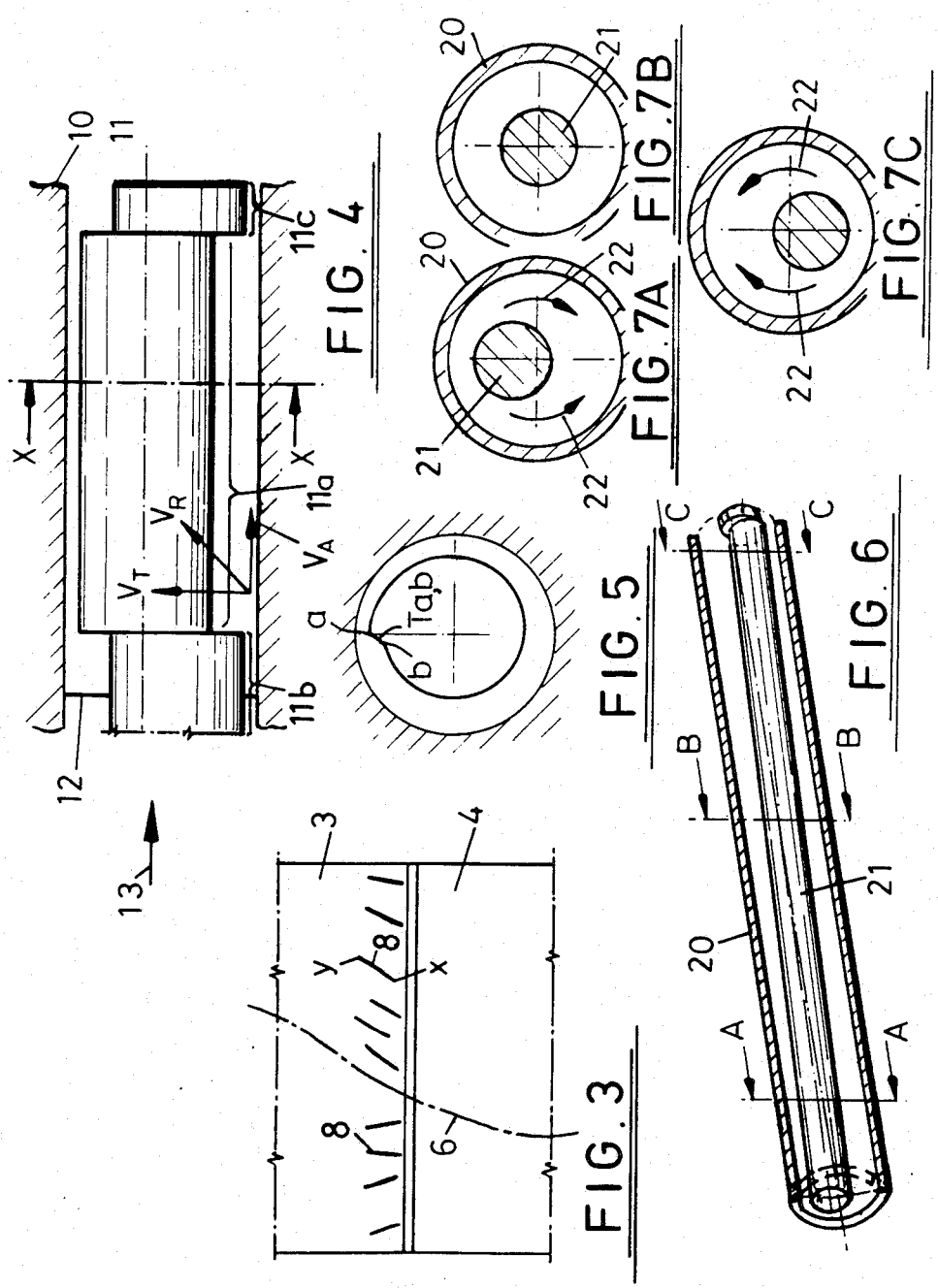

MATERIAL PROCESSING

The present invention relates to materials processing, particularly but not exclusively processing of polymer melts (e.g. by extrusion).

The extrusion technique is well established for the production of plastics articles, e.g. sheets and pipes, but does have certain disadvantages associated with the flow pattern of the molten material in the extrusion die. The production of discontinuous fiber reinforced plastics sheet may be cited as an example. During production of such sheets, the flow pattern of the molten plastics material results in the fibers becoming more or less uniaxially aligned in the direction of extrusion. The resultant sheet is substantially anisotropic.

A further example is the production of tubular material. In this case, the flow pattern tends to align reinforcing fibers parallel to the tube axis whereas it may be desirable that the fibers be aligned at various angles to this axis so as to increase the hoop strength.

An additional problem arises in the production of pipes (whether reinforced or not) due to the formation of so-called weld lines. These lines result from the struts (or 'spiders') used to hold the central core of the die in position. Molten material must flow around these struts resulting at the downstream side thereof in weld lines (or join) where the separated flow lines again meet. The resultant pipe includes a number (depending on the number of struts) of axially parallel weld lines which may or may not be visible but which represent weaknesses in the pipe.

Finally, in the production of sheets and pipes as discussed above, it may be desired to control the molecular orientation within the product (e.g. to give multiaxial, orientation) and such control can be difficult to achieve using the conventional apparatus.

It is an object of the present invention to obviate or mitigate the abovementioned disadvantages.

According to a first aspect of the present invention there is provided a method of extruding a solidifiable material through an extrusion die wherein a pressure differential is established across the die transverse to the extrusion direction thereby to create a flow of material through the die having a velocity component transverse to the extrusion direction.

Preferably the pressure differential transverse to the extrusion direction is continuous thereby establishing a continuous change of velocity component transverse to the extrusion direction.

Preferably also there is at least one reversal of transverse pressure differential (and hence transverse velocity component) during the extrusion of the material.

According to a second aspect of the present invention there is provided an extrusion die having an axially extending extrusion channel wherein, in its cross-sectional plane transverse to the flow direction, the channel is shaped to establish a pressure differential transverse to the axial flow direction. This shaping is preferably such that, in the said cross-sectional plane, the depth of the channel varies in a direction transverse to the axial flow direction.

In addition to the extrusion methods and apparatus defined in the two preceding paragraphs, the invention also provides other methods of, and apparatus for, materials processing which embody the same principles.

The invention will be further described by way of example only with reference to the accompanying drawings, in which:

FIG. 1 is a diagrammatic plan view of one embodiment of extrusion apparatus in accordance with the invention for producing sheet material;

FIGS. 2a-2e are sectional views on the line a—a, b—b, c—c, d—d, and e—e of the apparatus shown in FIG. 1;

FIG. 3 is a detail of FIG. 1;

FIG. 4 is a part sectional view of one embodiment of extrusion die for producing a pipe;

FIG. 5 is a sectional view of the line X—X of the die shown in FIG. 4;

FIG. 6 is a part sectional view of a further embodiment of die; and

FIGS. 7a-c are sectional views on the lines A—A, B—B and C—C of FIG. 6.

Referring to FIG. 1, the extrusion apparatus 1 illustrated therein is intended for producing fiber-reinforced plastics sheet and comprises an inlet section 2 (fed by an extruder screw-not shown), a first die section 3, a second die section 4, a third die section 5 and an outlet die section 6. FIGS. 2a-e respectively illustrate transverse cross-sectional views (taken on the lines a—a, b—b, c—c, d—d and e—e of FIG. 1) of the die sections 2-6. It will be seen from FIGS. 2a-e that each of the adjacent extruder sections is of different cross-sectional configuration and the reasons for this will be decribed more fully below. It should also be noted from FIG. 1 that between each adjacent extruder section is a transition region $T_{i,j}$ where i is the reference numeral allocated to the upstream section and j is the reference numeral allocated to the downstream one. Thus, the transition region between inlet section 2 and first die-section 3 is referenced as $T_{2,3}$. These transition regions, $T_{i,j}$ (as their name suggests) are shaped to provide a continuous transition from the cross-sectional shape of section i to that of section j. The regions $T_{i,j}$ are as short as possible in length without providing such an abrupt transition that there would be stagnation points at which molten material passing through the extrusion apparatus would accumulate.

Each of sections 2 to 6 will now be described in more detail.

Inlet section 2 is illustrated as being of rectangular cross-section as viewed along line a—a (FIG. 2a) and diverges from the extruder screw (not shown) to the first die section 3. The inlet section need not be of rectangular section along its length and may be of the type referred to in the industry as a coat-hanger die.

First die section 3 is of the constant trapezoidal section shown in FIG. 2b along its length between transition regions $T_{2,3}$ and $T_{3,4}$ and will be seen (as viewed in FIG. 1) to be of greater depth at its right hand side 3r than at its left hand side 3l.

Second die section 4 is also of constant trapezoidal cross-section (FIG. 2c) along its length between transition regions $T_{3,4}$ and $T_{4,5}$. This cross-section is dimensionally the same as that of die section 3 but is turned through 180° relative thereto (as will be appreciated from a comparison of FIGS. 2b and 2c). In other words, die section 4 is deeper at its left hand side 4l (as viewed in FIG. 1) than at its right 4r.

Third die section 5 is of the same cross section and orientation as that of die section 3.

Outlet section 6 is of constant rectangular cross-section throughout its length and, as will be described in more detail below, serves to ensure that the extruded sheet material exiting from apparatus 1 has a flat velocity profile to prevent warping of the extrudate.

In use of the apparatus, molten plastics material containing fiber reinforcement is supplied from the extruder screw (not shown) into inlet section 2 and then successively through sections 3–5 along a line of pressure drop $P_1$-$P_2$ ($P_1$ $P_2$) before emerging from the apparatus as extruded sheet material.

The flow of material in each of sections 2 to 4 is influenced by the flow in the adjacent downstream section. Consider, for example, section 3. Owing to the fact that its trapezoidal cross-section is displaced by 180° relative to that of the immediately downstream section 4, a pressure differential is established across section 3 such that the pressure $P_3$ at the right hand side $3r$ (the deeper side) is less than the pressure $P_4$ at the left hand side $3l$ (the shallow side). A velocity gradient is therefore established across section 3 in the opposite direction to the pressure gradient (i.e. $V_1$ $V_2$). At any point within section 3, the molten material will tend to flow in the direction of a velocity vector $V_R$ which is the resultant of the axial velocity component $V_A$ and the transverse velocity component $V_T$ at that point. These velocity components $V_A$ and $V_T$ vary along the length and across the breadth of section 3 so that the magnitude and direction of $V_R$ changes throughout the section. For example, the axial velocity component $V_A$ at the upstream end of side $3l$ is less than at the upstream end of side $3r$ whereas the opposite is true for the transverse components $V_T$ at these points. It is these variations which influence the flow in section 2 (in the manner detailed below). Moreover, the value of $V_A$ increase in the downstream direction along side $3l$ whereas the opposite is true along side $3r$. This variation is due to the effect imposed by the opposite orientation of section 4 (vis a vis section 3) which results in pressure and velocity gradients therein which are in the opposite directions to those in section 3. It should also be mentioned that, within section 4, the flow is influenced by that within section 5 (owing to the different orientation of the respective trapezoidal cross-section). As a further point it should be noted that (as will be appreciated from the subsequent description) neither of sections 3–5 are of such length that steady state fiber orientation conditions are established therein.

The overall effect is that, in any cross-sectional plane of the apparatus, there is a maximum value of $V_R$ (which may not be the same along the length of the apparatus or indeed along any one section) which changes along the axial length of the apparatus. This is illustrated by the line 6 shown in FIG. 1 which is the line along which the maximum value of $V_R$ for any transverse sectional plane of the apparatus is to be found.

Referring back now to section 3, it was explained above that the magnitude and direction of $V_R$ changes throughout the section. At any point within the section, a fiber 8 will, depending on the magnitude of $V_R$ at that point tend to be aligned to a greater or lesser extent along the direction of $V_R$. However, as the fiber moves through section 3, the magnitude and direction of $V_R$ changes with the result that the fiber 8 is continuously being reoriented. It should be noted that, owing to the influence of the flow in section 3 on that in section 2, this orientation of the fiber 8 begins in this latter section rather than when it enters section 3.

At the downstream end of section 3, the orientation of fibers 8 (before entry into section 4) will typically be as shown in FIG. 3 and it will be seen that these fibers make a range of angles with respect to the line $P_1$-$P_2$. For any particular fiber 8 in section 3 its leading end x will be in a velocity stream moving more quickly (albeit only slightly) than that in which its trailing end y locates (due to the velocity gradient across section 3).

As the fiber passes transition section $T_{3,4}$, it enters die section 4 in which the velocity gradient is reversed as compared to section 3. Within this section, the fiber 8 is also subjected to continuously changing values in the magnitude and direction of $V_R$ to cause reorientation of the fiber. In more detail, the end x of the fiber which, in section 3, formed the leading end and was in a higher velocity stream than the trailing end is now in a lower velocity stream than end y. The result is that end y is accelerated forwards relative to end x to reorientate the fiber.

It will be recalled that the fibers in section 3 are oriented at different angles to the line $P_1$-$P_2$ and consequently enter section 4 at different angles. The extent to which a fiber is reoriented in section 4 depends on its angle of entry thereto together with the viscosity of the molten material and the residence time in section 4. Since the fibers in die section 3 are oriented at different angles, their resultant reorientations in die section 4 will be different with the result that, in this section, the fibers will become randomly oriented. In fact, fibers in section 4 will criss-cross each other to produce a matting effect. Moreover since steady state fiber orientation conditions are not established in die section 4, the fibers maintain their random orientation as they enter outlet section 6. The purpose of this section is merely to establish rectangular cross-section for the extrudate (to prevent warping as the material exits the apparatus). However the length of section 5 is not so long that the fibers reorient themselves along the flow direction.

The resultant sheet is planar isotropic which results from the fact that the fibers are more or less randomly oriented within the solidified plastics material.

Additionally the flow conditions within the apparatus ensure a multi-axial orientation of the polymer molecules.

It will of course be appreciated that the illustrated apparatus may be used for the production of non-reinforced sheet material.

It should be appreciated that a number of modifications may be made to the illustrated extrusion apparatus. Thus, for example, only one of each of sections 3 and 4 need be provided. Alternatively two or more of each of sections 3 and 4 may be provided in alternating relationships. Additionally, the section 3 need not be of the same cross-section (when considered after rotation of one of these cross-sections through 180°) nor do the individual sections need to be of the same length. Furthermore, at least the section immediately upstream of the outlet section 6 may increase in depth along its axial length to assist in achieving a flat velocity profile in section 6. Finally, sections 3 and 4 may have a transverse cross-section other than that illustrated so as to assist in the production of sheet material of rectangular cross-section from particular polymeric materials.

It should be appreciated that with all of the possible variations which may be made it is possible to engineer the extrusion apparatus to produce any desired properties for the sheet material, e.g. degree of molecular orientation, degree of fiber orientation etc.

FIGS. 4 and 5 illustrate one embodiment of extrusion die for producing pipes by using the principle of the invention. The illustrated die comprises on outer, circular section housing 10 in which a core member 11 is supported with clearance by spiders 12. The core member 11 has, over that section of its length designated as 11a, a cross-section as illustrated in FIG. 5. This cross-section is akin to one turn of a spiral such that the surface of core-member 11 progressively increases in distance from the inner surface of the housing 10 going (in a clockwise direction as viewed in FIG. 5) from its point a of closest approach thereto to its most distant point b therefrom. A transition region $T_{a,b}$ extend between points a and b. The section of core member 11 designated in FIG. 4 as 11b has a transverse section identical to that of section 11a but displaced through 180°. The cross-section of 11c is identical to, and of the same orientation as, that of 11b.

Although not illustrated in the drawing the extrusion die will preferably have an outlet section to ensure that a pipe of uniform wall thickness is produced.

In use of the illustrated die, a pressure differential is established around the core member 11 such that the pressure decreases from a maximum at point a to a minimum at point b. A velocity gradient is thus established around core-member 11, in the same way that one was established across die sections 3 and 4 of the apparatus illustrated in FIG. 1.

The pressure differential results in molten material which is supplied to the direction of arrow 13 having a velocity component $V_T$ transverse to the axial flow direction along which the material has a velocity component $V_A$. The resultant velocity vector is shown as $V_R$. The value of $V_R$ varies around the periphery of core member 11 (due to the cross section thereof). So, as in the case of the apparatus shown in FIG. 1, fibers incorporated in the material will be subject to continuous reorientation. Overall the material follows a helical path around section 11a the length of which may be such that the material executes a single turn of a helix or only part thereof. As explained above, fibers incorporated in the molten material are continuously reoriented so as to be inclined at various angles to the tube axis, thus improving the hoop stress of the resultant tube.

As mentioned above, core 11 is supported by spiders 12 which tend to lead to the production of axially parallel weld lines due to the need for the molten material to flow around the spiders 12. In order to eliminate these weld lines it is beneficial to establish a velocity gradient through the thickness of the molten material in the transverse direction. To this end, the section of core member 11 designated in FIG. 4 as 11b has a transverse section identical to that of section 11a but displaced through 180° such that there is a step formation as illustrated between the two sections. This step formation results in a high velocity gradient through the thickness of the material in the transverse direction.

Thus, three mutually perpendicular velocity components are present, and the resultant movement of the material causes the elimination of weld lines.

The apparatus shown in FIG. 4 has been described with specific reference to fiber reinforced tubes. However it will be appreciated that the flow patterns established within the die also affect the molecular orientation within the material.

Having regard to the above description it will be appreciated that the apparatus illustrated in FIG. 4 may be (as in the case of that illustrated in FIG. 1) engineered to such particular requirements. Thus, for example, the apparatus may have two comparatively short inlet sections separated by step portions for the elimination of weld lines followed by two longer sections shaped and dimensioned to ensure biaxial molecular orientation within the product.

FIGS. 6 and 7 show a further embodiment of die for producing a pipe. In this case the die comprises a circular section housing 20 with a circular section core-member 21. This core member is supported (e.g. by spiders not shown) such that its longitudinal axis is angled with respect to, and at its center intersects with, the longitudinal axis of the housing 20.

At the said point of intersection of the axes, the cross-section of core-member 21 is concentric with that of housing 20 (FIG. 7B) whereas, on either side of the intersection, these sections are eccentric (FIGS. 7A and 7C). Owing to the fact that the eccentricities upstream of the point of intersection of the axes are displaced by 180° relative to those downstream of this point, pressure gradients are established around the core-member 11 resulting in a velocity gradient therearound. To the left (as viewed in FIG. 7) of the intersection point, this velocity has components represented by arrows 22 whereas, to the right of the intersection points the velocity gradients are in the opposite direction as represented by arrows 23. Consequently, in this embodiment, the molten material is subjected to a reversal of flow, much the same way as occurs in the apparatus illustrated in FIG. 1.

A further embodiment of die (not-shown) for extruding as pipe in accordance with the principle of the invention would comprise a circular housing having a central core member constructed as a series of identical circular discs mounted in adjacent face-to-face relationship with their centers on a helical locus.

Although the dies illustrated in FIGS. 4-7 (and the die mentioned in the preceding paragraph) have been described with specific reference to the production of tubes as the end product, it should be appreciated that these dies may also be used for the production of tubular parisons which are subsequently blow-molded to produce the finished product.

It should also be appreciated that the invention may be used to produce a wide range of extruded products, e.g. biaxially or multiaxially or oriented films.

Finally, it should also be appreciated that the principals embodied in the present extrusion method may also be used in other techniques, such as injection molding.

I claim:

1. A method of materials processing in which the material flows along an axially extending passageway with successive upstream and downstream sections wherein the cross-section (as viewed in the plane transverse to the flow direction) of the inlet to the downstream section has first and second end regions between which the length (as viewed in said cross-section) of the channel extends and this cross-section increases progressively in depth from the first end region to the second end region thereof, and said first and second end regions are respectively of lesser and greater depth than the adjacent end region of the outlet of the upstream section, whereby a pressure differential is established in said sections so as to create therein a flow of material having a velocity component transverse to the flow direction.

2. A method as claimed in claim 1 wherein the axially extending passageway is an extrusion die.

3. A method as claimed in claim 2 wherein said pressure differential is continuous thereby establishing a continuous change of velocity component without any disruption of the flow in said section transverse to the axial flow direction.

4. A method as claimed in claim 1 wherein the cross-section of the outlet of upstream section increases progressively in depth from a first end to a second end region thereof and the inlet to the downstream section has the same cross-section as that of the outlet to upstream section but displaced through 180°.

5. A method as claimed in claim 4 wherein the cross-sections of said upstream and downstream sections are constant over at least a part of their axial lengths.

6. A method as claimed in claim 5 wherein each said cross-section is trapezoid.

7. A method as claimed in claim 5 wherein the upstream and downstream sections are generally annular with one boundary in the form of one turn of a spiral as viewed in the plane transverse to flow direction so as to give said progressive increase in depth within said inlet and outlet ends.

8. A method as claimed in claim 1 wherein each said cross-section varies along the axial length of the section.

9. A method as claimed in claim 1 wherein said material is a molten plastics material.

10. A method as claimed in claim 1 wherein said material includes a fibrous filler.

11. Material processing apparatus having an axially extending flow passageway with successive upstream and downstream sections wherein the cross-section (as viewed in the plane transverse to the flow direction) of the inlet to the downstream section has first and second end regions between which the length (as viewed in said cross-section) of the channel extends and this cross-section increases progressively in depth from the first end region thereof to the second end region thereof, and said first and second end regions are respectively of lesser and greater depth than the adjacent end regions of the outlet of the upstream section whereby, in use of the apparatus, there is established in the downstream section a pressure differential transverse to the axial flow direction so as to create a material with a velocity component transverse to the flow direction.

12. Apparatus as claimed in claim 11 wherein the cross-sections of the upstream and downstream sections are shaped to establish a continuous change of pressure differential transverse to the flow direction in said one downstream.

13. Apparatus as claimed in claim 11 which is an extrusion die.

14. Apparatus as claimed in claim 11 wherein the outlet of the upstream section has a cross-section increasing in depth from a first end region to a second region thereof and the inlet of the downstream section has an identical cross-section but displaced through 180° relative to that of the outlet of the upstream section.

15. Apparatus as claimed in claim 14 wherein the cross-section of each of said upstream and downstream sections is constant over at least a part of the axial length of the respective section.

16. Apparatus as claimed in claim 15 wherein each said cross-section is trapezoid.

17. Apparatus as claimed in claim 15 wherein each said section is generally annular with one boundary in the form of one turn of a spiral.

18. Apparatus as claimed in claim 14 wherein said cross-section of each said upstream and downstream sections varies along their axial lengths.

19. Apparatus as claimed in claim 11 comprising an outlet section shaped such that, in use of the apparatus, there is substantially no velocity differential transverse to the axial flow direction in the outlet section.

20. Apparatus as claimed in claim 11 comprising in succession in the flow direction an inlet section, a said upstream section, a said downstream section, the cross-sections of said upstream and downstream sections being such that the pressure differential established in the latter is a reversal of that in the former, and an outlet section.

21. Apparatus as claimed in claim 20 wherein said upstream and downstream sections have cross-sections in the form of identical trapezoids with that of the upstream section being at 180° relative to that of the downstream section.

22. Apparatus as claimed in claim 11 wherein said flow passageway is defined by a cylindrical bore, and the upstream section has located therein with clearance a former with a boundary in the form of one turn of a spiral as viewed in the plane transverse to the flow direction there being a transition region between the ends of the spiral.

23. Apparatus as claimed in claim 11 wherein said flow passageway is defined by a cylindrical bore, and said downstream section of said flow passageway has located therein with clearance a former with a boundary in the form of one turn of a spiral as viewed in the plane transverse to the flow direction there being a transition region between the ends of the spiral.

24. Apparatus as claimed in claim 23 wherein said upstream section has located therein with clearance a former with a boundary in the form of one turn of a spiral as viewed in the plane transverse to the flow direction there being a transition region between the ends of the spiral, the former of the upstream section being displaced by 180° relative to that of the downstream section.

* * * * *